United States Patent
Duplessis et al.

(10) Patent No.: US 10,135,910 B2
(45) Date of Patent: Nov. 20, 2018

(54) CROSS-PLATFORM DOCUMENT PRESENTATION

(71) Applicant: International Business Machines Corporation, Armonk, NY (US)

(72) Inventors: Michael A. Duplessis, San Jose, CA (US); Andreas Eminidis, Ottawa (CA); Michael A. Iles, Ottawa (CA); Alireza Pourshahid, Ottawa (CA); Vinay N. Wadhwa, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 346 days.

(21) Appl. No.: 14/038,600

(22) Filed: Sep. 26, 2013

(65) Prior Publication Data

US 2015/0089349 A1 Mar. 26, 2015

(51) Int. Cl.
  *G06F 9/455* (2018.01)
  *H04L 29/08* (2006.01)
  *G06F 9/451* (2018.01)

(52) U.S. Cl.
  CPC .............. *H04L 67/10* (2013.01); *G06F 9/451* (2018.02); *G06F 9/45529* (2013.01); *H04L 67/02* (2013.01); *H04L 67/34* (2013.01)

(58) Field of Classification Search
  CPC ..... G06F 9/4443; G06F 9/45529; G06F 9/541
  USPC ................................................. 715/746, 243
  See application file for complete search history.

(56) References Cited

U.S. PATENT DOCUMENTS

| 6,802,058 B2 | 10/2004 | Banavar et al. |
| 7,340,718 B2 | 3/2008 | Szladovics et al. |
| 7,752,556 B2 | 7/2010 | Forstall et al. |
| 7,895,522 B2 | 2/2011 | Wong et al. |
| 7,934,162 B2 | 4/2011 | Wong et al. |
| 8,150,939 B1* | 4/2012 | Murray ............. G06F 17/30896 709/203 |
| 8,234,622 B2 | 7/2012 | Meijer et al. |
| 8,595,186 B1* | 11/2013 | Mandyam ................. G06F 8/38 707/632 |

(Continued)

FOREIGN PATENT DOCUMENTS

| CN | 101986300 A | 3/2011 |
| WO | 02065280 A2 | 8/2002 |
| WO | 2010099551 A2 | 9/2010 |

OTHER PUBLICATIONS

"Ways and Means to Display a Web Page comprising multiple widgets on to a Mobile Devices", ip.com, May 19, 2010, 4 pgs.

*Primary Examiner* — Dino Kujundzic (74) *Attorney, Agent, or Firm* — Shumaker & Sieffert, P.A.

(57) ABSTRACT

An application executing on a target platform renders one or more widgets of one or more widget types that are specified by a document including, for each respective widget type from the one or more widget types: render, by a first widget renderer for the respective widget type, the one or more widgets of the respective widget type upon determining that the application includes the first widget renderer for the respective widget type, and render, by a second widget renderer for the respective widget type, the one or more widgets of the respective widget type upon determining that the application does not include the first widget renderer for the respective widget type. The second widget renderer may be different from the first widget renderer.

15 Claims, 4 Drawing Sheets

(56) References Cited

U.S. PATENT DOCUMENTS

| | | | |
|---|---|---|---|
| 2005/0071758 A1* | 3/2005 | Ehrich | G06F 9/4443 715/234 |
| 2007/0288858 A1* | 12/2007 | Pereira | G06F 9/4443 715/764 |
| 2009/0248996 A1* | 10/2009 | Mandyam | G06F 3/04842 711/154 |
| 2012/0144290 A1* | 6/2012 | Goldman | G06F 9/45529 715/234 |
| 2014/0035945 A1* | 2/2014 | Anglin | G06F 3/14 345/619 |
| 2014/0109115 A1* | 4/2014 | Low | G06F 9/541 719/328 |
| 2014/0136945 A1* | 5/2014 | Ligman | G06F 17/2247 715/234 |

* cited by examiner

CROSS-PLATFORM DOCUMENT PRESENTATION

TECHNICAL FIELD

The disclosure relates to cross-platform presentation of documents.

BACKGROUND

For electronic content to reach a large number of users, it is often desirable for applications that allow users to view and interact with the electronic content to be available on a variety of computing platforms. However, because different computing platforms may differ in terms of processing speed, screen size, graphics capabilities and performance, interaction mechanisms, support for presentation technologies, and the like, it may be cost prohibitive in some instances to develop native applications for a large variety of computing platforms. To minimize development costs, a business may decide instead to develop a cross-platform application that is able to execute on a variety of computing platforms, so that the cross-platform application may allow users on a wide variety of computing platforms to view and interact with the electronic content. However, because the cross-platform application may have to run on a variety of computing platforms having varying computing capabilities, the cross-platform application may be coded to cater to the lowest common denominator computing capabilities and thus may not be able to take advantage of additional features available on higher-end computing platforms.

SUMMARY

In general, the disclosure is directed to techniques that may enable electronic content to be rendered by a variety of computing platforms. Optimized renderers comprising native code that takes advantage of certain native features of the computing platform on which it is executed may be available for at least a portion of content to render the content on some of the computing platforms. Default renderers comprising cross-platform code may be available across all types of content to render at least a portion of the content on a variety of computing platforms. Therefore, if an optimized renderer is not available for content of a specific type, that content may still be rendered using a default renderer for the specific type of content. In this way, a potentially best-in-class native experience can be provided via optimized renderers for certain types of content and certain computing platforms while still allowing all other content to be viewed and interacted with on a wide variety of computing platforms via default renderers.

In one aspect, the disclosure is directed to a method. The method includes rendering, by an application executing on a target platform, one or more widgets of one or more widget types that are specified by a document, the rendering including, for each respective widget type from the one or more widget types: rendering, by a first widget renderer for the respective widget type, the one or more widgets of the respective widget type upon determining that the application includes the first widget renderer for the respective widget type, and rendering, by a second widget renderer for the respective widget type, the one or more widgets of the respective widget type upon determining that the application does not include the first widget renderer for the respective widget type, the second widget renderer being different from the first widget renderer.

In another aspect, the disclosure is directed to a system. The system includes at least one processor. The system further includes at least one memory device. The system further includes at least one module stored by the at least one memory device and executable by the at least one processor, wherein the at least one module is configured to perform operations comprising: rendering, by an application executing on a target platform, one or more widgets of one or more widget types specified by a document, the rendering including, for each respective widget type from the one or more widget types: rendering, by a first widget renderer for the respective widget type, the one or more widgets of the respective widget type upon determining that the application includes the first widget renderer for the respective widget type, and rendering, by a second widget renderer for the respective widget type, the one or more widgets of the respective widget type upon determining that the application does not include the first widget renderer for the respective widget type, the second widget renderer being different from the first widget renderer.

In another aspect, the disclosure is directed to a computer program product. The computer program product comprising a computer readable storage medium having program code embodied therewith, the program code executable by at least one processor to: render, by an application executing on a target platform, one or more widgets of one or more widget types specified by a document, the rendering including, for each respective widget type from the one or more widget types: render, by a first widget renderer for the respective widget type, the one or more widgets of the respective widget type upon determining that the application includes the first widget renderer for the respective widget type, and render, by a second widget renderer for the respective widget type, the one or more widgets of the respective widget type upon determining that the application does not include the first widget renderer for the respective widget type, the second widget renderer being different from the first widget renderer.

The details of one or more aspects of the disclosure are set forth in the accompanying drawings and the description below. Other features, objects, and advantages of the disclosure will be apparent from the description and drawings, and from the claims.

DETAILED DESCRIPTION

Figure 1:
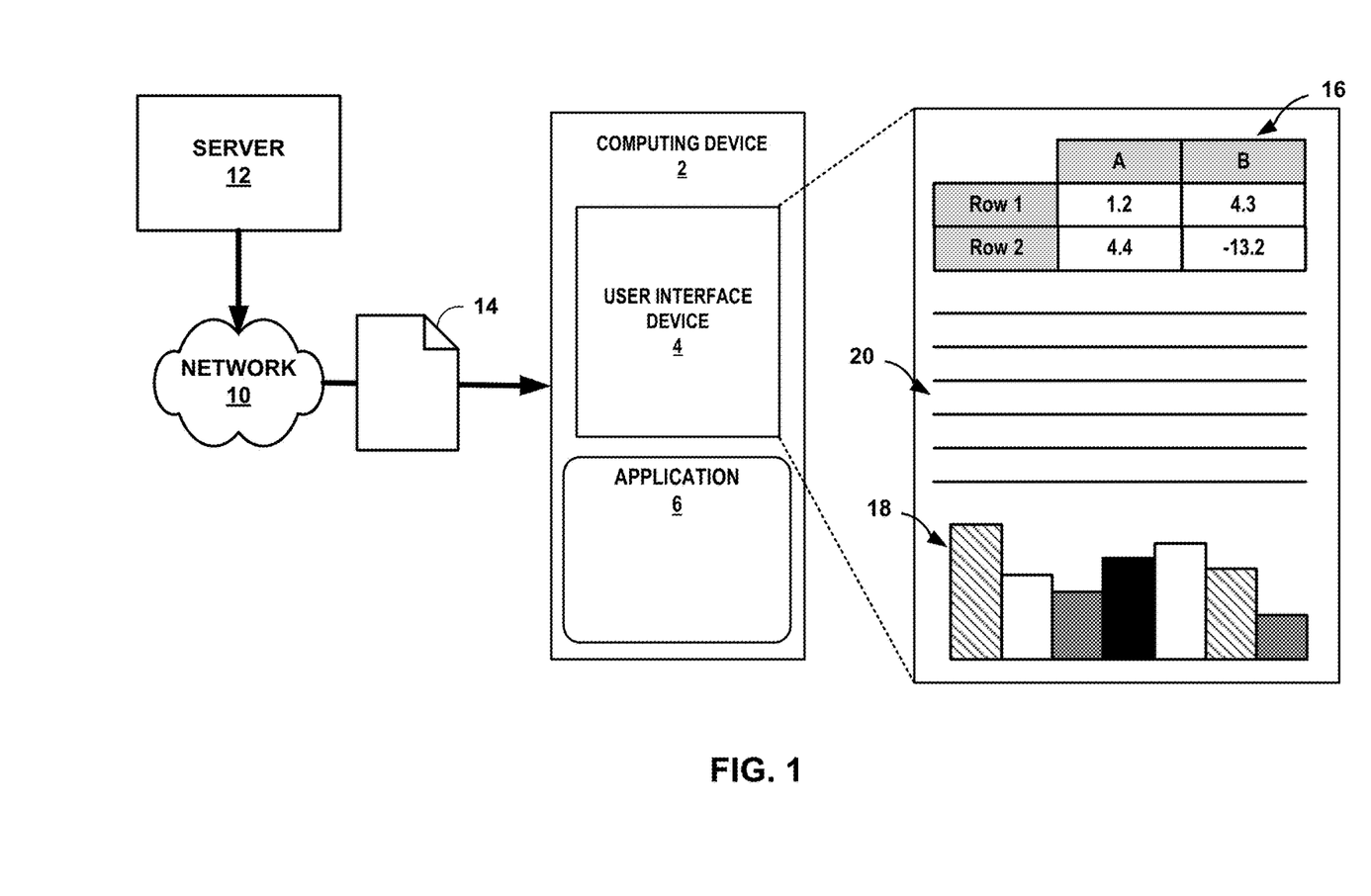
FIG. 1 is a block diagram illustrating an example computing system that may be used for cross-platform document presentation, according to some aspects of the present disclosure.

FIG. 1 is a block diagram illustrating an example computing system that may be used for cross-platform document presentation, according to some aspects of the present disclosure. As shown in FIG. 1, server 12 may communicate with computing device 2 via network 10 to communicate document 14 to computing device 2. Document 14 may specify content that may be rendered by computing device 2. The content specified by document 14 may include widgets, such as widgets 16 and 18, as well as static elements, such as static element 20. Computing device 2 may receive document 14 and may execute application 6 to render the content specified by document 14 for display at user interface device 4. Rendering content specified by document 14 may include rendering widgets 16 and 18 and static element 20. Rendering widgets 16 and 18 and static element 20 may be the process of processing widgets 16 and 18 and static element 20 to visually present widgets 16 and 18 and static element 20 as formatted content at a user interface.

Document 14 may be a specification that describes the appearance and behavior of content that may be rendered by an application, such as application 2. In some examples, the content described in document 14 may include one or more linked screens of information. The content described in document 14 may include widgets and/or static elements. Document 14 may specify the layout of the widgets and/or static elements, the widget types of widgets specified in document 14, the network location of default widget renderers for the widgets specified in document 14, widget specifications for each widget specified in document 14, and other information such as rules for event propagation between widgets. Document 14, in some examples, may be a structured document, such as an Extensible Markup Language (XML) document, a HyperText Markup Language (HTML) document, and the like.

Widgets 16 and 18 specified by document 14 may each be, when rendered by application 6 of computing device 2, an interactive visual element presented at user interface device 4 of computing device 2. For example, widgets 16 and 18, when rendered by application 6, may present interactive charts, graphs, and other interactive audiovisual elements that a user may view and/or with which the user may otherwise interact using user interface device 4.

Each widget may be a specified widget type out of a fixed population of widget types. For example, widget 16 may be a table widget type and widget 18 may be a bar graph widget type. A widget renderer may be responsible for rendering widgets of a specific widget type. In one example, document 14 may include code that specifies widgets 16 and 18. The code that specifies widgets 16 and 18 may, in one example, be markup code, such as HTML code, that, for each of widgets 16 and 18, specifies the widget type, the data to be presented by the respective widget, the appearance and behavior of the widget, and the like. Widget renderers may read the code that specifies widgets 16 and 18 and may render widgets 16 and 18 based on that code.

A widget renderer may be either an optimized widget renderer for a widget type or a default widget renderer for the widget type. A first widget renderer (e.g., an optimized widget renderer) may be a widget renderer that is written in the native code and application program interfaces (APIs) for a computing device so that it may be compiled or otherwise processed into machine code for the computing device. A second widget renderer (e.g., a default widget renderer), on the other hand, may be a widget renderer that is written in a cross-platform code, such as by using cross-platform web technologies (e.g., JavaScript), which is interpreted by any application, such as a web browser, and which is able to interpret the cross-platform code so that the code may be executed on computing device 2. Typically, widgets rendered by an optimized widget renderer may provide a richer and more interactive user experience compared to the same widgets rendered by a default widget renderer. For example, widgets rendered by an optimized widget renderer may include native features of its target platform that is unavailable on some other platforms. In contrast, widgets rendered by a default widget renderer may be limited to using a lowest common denominator set of features that are available across a variety of platforms. While a default widget renderer may exist for every widget type, an optimized widget renderer may exist for only a subset of (e.g., less than all) the fixed population of widget types.

Application 6 renders widgets 16 and 18 based at least in part on the widget types of widgets 16 and 18 and further based at least in part on whether application 6 includes an optimized widget renderer for the widget types of widgets 16 and 18. If application 6 includes an optimized widget renderer for the widget types of widgets 16 and 18, then application 6 may use the optimized widget renderer to render widgets 16 and 18. However, if application 6 does not include an optimized widget renderer for the widget types of widgets 16 and 18, then application 6 may attempt to use a default widget renderer for the widget types of widgets 16 and 18 included in application 6 to render widgets 16 and 18. If application 6 does not include the default widget renderers for the widget types of widgets 16 and 18, computing device 2 may determine, based on the network location specified by document 14, the network location where default widget renderers may be downloaded and may communicate with the network location specified by document 14 to download the default widget renderers for the widget types of widgets 16 and 18. In this way, application 6 is able to render widgets 16 and 18 regardless of whether application 6 includes widget renderers that are able to render widgets 16 and 18.

Figure 2:
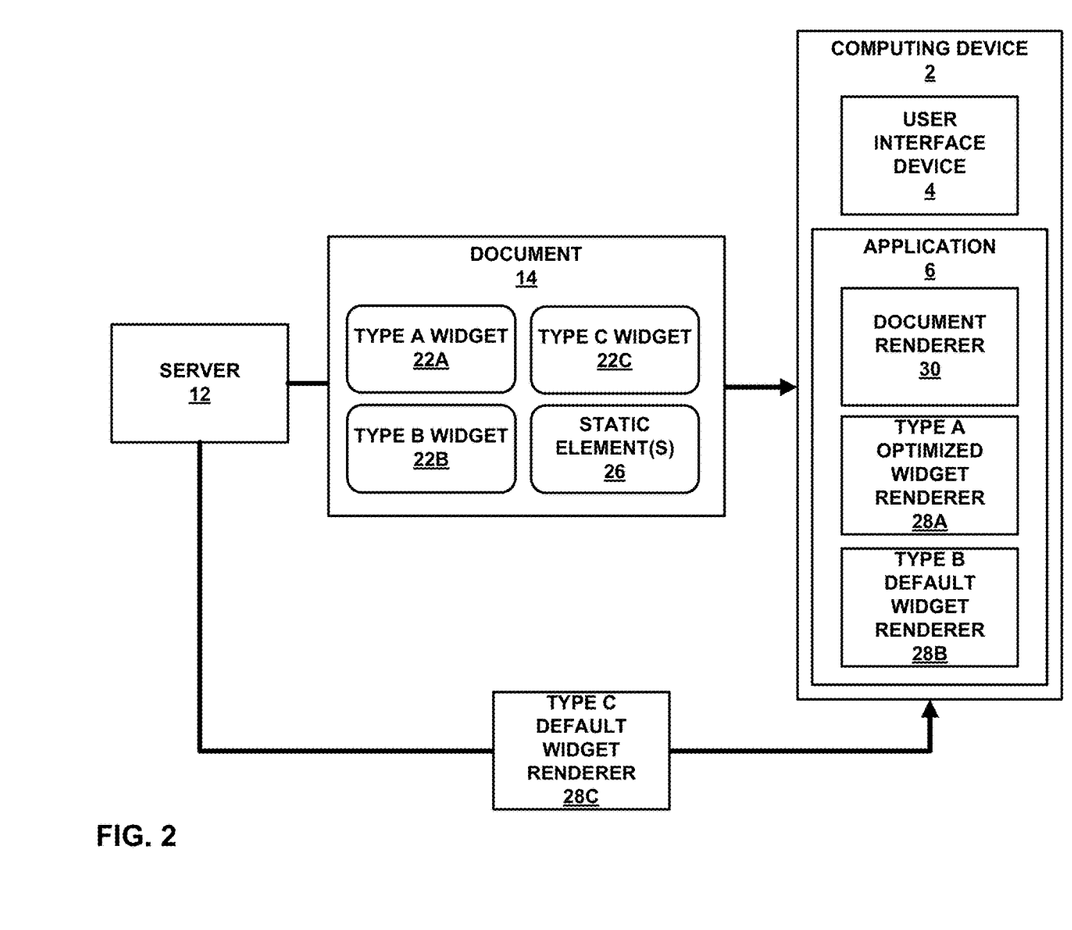
FIG. 2 is a block diagram illustrating an example computing system that may be used for cross-platform presentation of a document that specifies one or more widgets, according to some aspects of the present disclosure.

FIG. 2 is a block diagram illustrating an example computing system that may be used for cross-platform presentation of a document that specifies one or more widgets according to some aspects of the present disclosure. As shown in FIG. 2, computing device 2 may receive document 14 from server 12 and may render the content specified by document 14 in a user interface. Computing device 2 may output the user interface including the rendered content specified by document 14 to user interface device 4.

In the example shown in FIG. 2, document 14 may specify type A widget 22A, type B widget 22B, type C widget 22C, as well as one or more static elements 26. Widgets 22A-22C specified by document 14 may each include respective specifications that govern the appearance and behavior of the respective widget types. Document 14 may also specify a network location (e.g., the Internet) where default widget renderers for the associated widget types may be located. For example, document 14 may specify uniform resource locators (URLs) indicating an Internet address for the default widget renderers for the widget types. In one example, document 14 may specify that one or more default widget renderers are located at server device 12. In other examples, document 14 may specify that one or more default widget renderers are located at server devices (not shown) other than server device 12, so that default widget renderers are not necessarily stored at the same server device 12 as document 14.

Document renderer 30 may be a specialized process of application 6 that is configured to processes document 14 and to render the elements specified by document 14 in a user interface. Application 6 may include document renderer 30 as well as one or more widget renderers configured to render the widgets specified by document 14. Document renderer 30 may be a specialized process of application 6 that is configured to process document 14, including laying out and hosting the widgets specified by document 14, choosing the appropriate widget renderers for the widgets specified by document 14, handling user interactions with document 14, propagating events between widgets specified by document 14, and the like.

Widget renderers may each be configured to render a specific widget type and may further each be configured to handle user interactions, fire and receive events, and the like. Widget renderers may be categorized into optimized widget renderers and default widget renderers. An optimized widget renderer may be a widget renderer that is written in the native code and application program interfaces (APIs) for computing device 2, so that it may be compiled or otherwise processed into machine code for computing device 2. A default widget renderer, on the other hand, maybe a widget renderer that is written in a cross-platform code, typically using web technologies (e.g., JavaScript), that is interpreted by any application across multiple target platforms able to interpret and/or execute the cross-platform code. For example, application 6 may be a web browser that is able to interpret a default widget renderer that is written in JavaScript.

In response to application 6 receiving document 14 from server 212, document renderer 30 of application 6 may render document 14 at a user interface which may be outputted by user interface device 4. Rendering document 14 may include rendering the elements specified by document 14, including rendering type A widget 22A, type B widget 22B, type C widget 22C, and one or more static elements 218.

Document renderer 30 may determine that the widgets included in document 14 include type A widget 22A, type B widget 22B, and type C widget 22C. Document renderer 30 may further determiner that, in the example shown in FIG. 2, application 6 may include type A optimized renderer 28A for rendering type A widgets and type B default widget renderer 28B for rendering type B widgets. Document renderer 30 may determine, for type A widget 22A, if document renderer 30 includes an optimized widget renderer for type A widgets. In response to determining that document renderer 30 includes type A optimized widget renderer 28A, document renderer 30 may enable type A optimized widget renderer 28A to render type A widget 22A.

Document renderer 30 may further determine, for type B widget 22B, if document renderer 30 includes an optimized widget renderer for type B widgets. In response to determining that document renderer 30 does not include an optimized widget renderer for type B widgets, document renderer 30 may determine if document renderer 30 includes a default widget renderer for type B widgets. In response to determining that document renderer 30 includes type B default renderer 28B, document renderer 30 may enable type B default widget renderer 28B to render type B widget 22B.

Document renderer 30 may further determine, for type C widget 22C, if document renderer 30 includes an optimized widget renderer for type C widgets. In response to determining that document renderer 30 does not include an optimized widget renderer for type C widgets, document renderer 30 may determine if document renderer 30 includes a default widget renderer for type C widgets. In response to determining that document renderer 30 does not include a default widget renderer for type C widgets, document renderer 30 may determine, based on type C widget specification 24C included in document 14, a network location where a default renderer for type C widgets is located. Application 6 may query the network location for a default renderer for type C widgets and may download type C default widget renderer 28C from the network location specified by type C widget specification 24C. In response to receiving type C default widget renderer 28C, document renderer 30 may enable type C default widget renderer 28C to render type C widget 22C.

Figure 3:
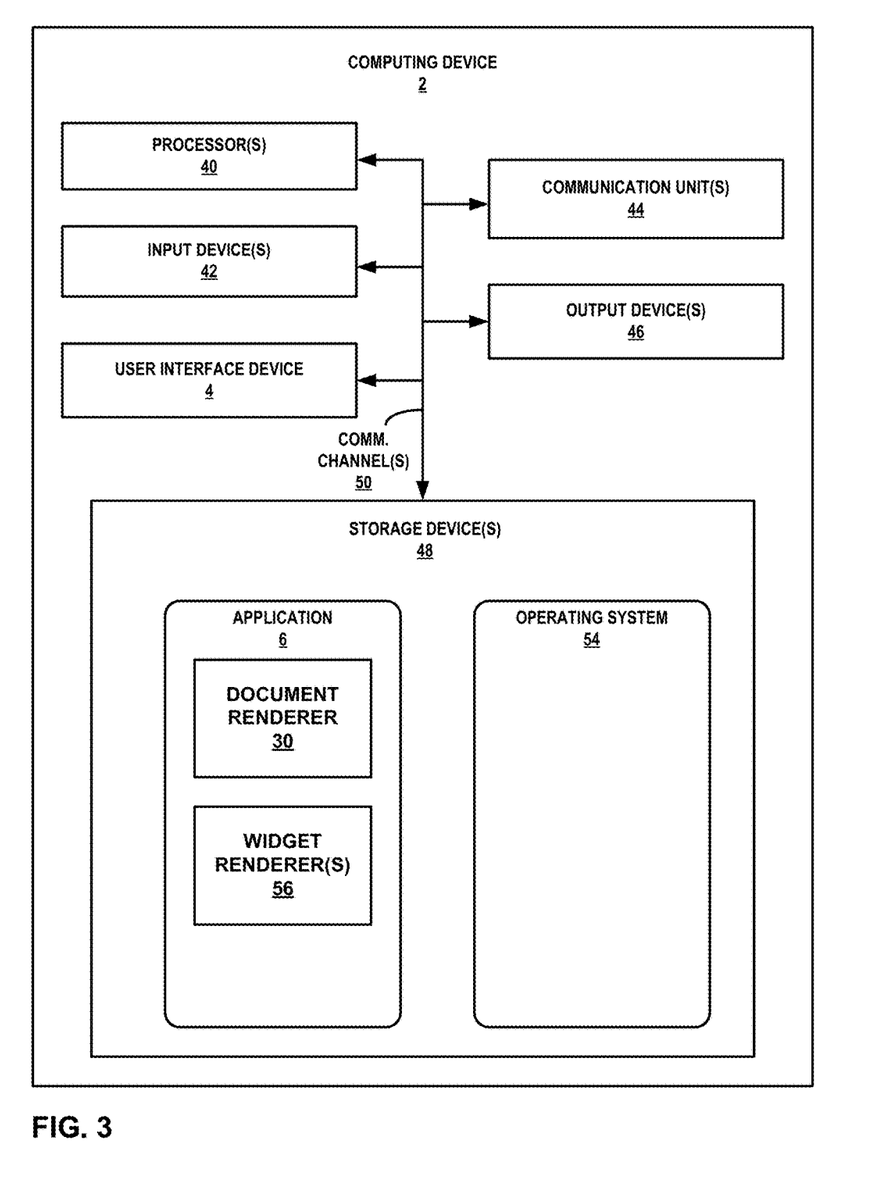
FIG. 3 is a block diagram illustrating an example computing device according to some aspects of the present disclosure.

FIG. 3 is a block diagram illustrating an example computing device according to some aspects of the present disclosure. In some examples, computing device 2 can include fewer, additional, or different components compared to those illustrated in FIG. 3. As shown in the example of FIG. 3, computing device 2 may include one or more processors 40, one or more input devices 42, one or more communication units 44, one or more output devices 46, user interface device 4, and one or more storage devices 48. In this example, storage devices 48 of computing device 2 may include operating system 54, and application 6. Communication channels 50 may interconnect each of the components 4, 40, 42, 44, 46, and 48 for inter-component communications (physically, communicatively, and/or operatively). In some examples, communication channels 50 may include a system bus, a network connection, an inter-process communication data structure, or any other method for communicating data.

One or more input devices 42 of computing device 2 may receive input. Examples of input are tactile, audio, and video input. Input devices 42 of computing device 2, in one example, include a presence-sensitive display, touch-sensitive screen, mouse, keyboard, voice responsive system, video camera, microphone or any other type of device for detecting input from a human or machine.

One or more output devices 46 of computing device 2 may generate output. Examples of output are tactile, audio, and video output. Output devices 46 of computing device 2, in one example, include a presence-sensitive display, sound card, video graphics adapter card, speaker, cathode ray tube (CRT) monitor, liquid crystal display (LCD), or any other type of device for generating output to a human or machine. In some examples, user interface device 4 may be one of one or more output devices 46. For example, user interface device 4 may be a display.

One or more communication units 44 of computing device 2 may communicate with wired or wireless external devices via one or more networks by transmitting and/or receiving network signals on the one or more networks. For example, computing device 2 may use communication units 44 to transmit and/or receive radio signals on a radio network such as a cellular radio network. Likewise, communication units 44 may transmit and/or receive satellite signals on a satellite network such as a GPS network. Examples of communication units 44 include a network interface card (e.g. such as an Ethernet card), an optical transceiver, a radio frequency transceiver, a GPS receiver, or any other type of device that can send and/or receive information. Other examples of communication units 44 may include Bluetooth®, GPS, 3G, 4G, and Wi-Fi® radios found in mobile devices as well as Universal Serial Bus (USB) controllers.

One or more storage devices 48 within computing device 2 may store information required for use during operation of computing device 2. Storage devices 48, in some examples, have the primary purpose of being short term and not long-term computer-readable storage mediums. Storage devices 48 on computing device 2 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art. Storage devices 48 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 48 may store program instructions and/or data associated with one or more of application 6.

One or more processors 40 may implement functionality and/or execute instructions within computing device 2. For example, processors 40 on computing device 2 may read and execute instructions stored by storage devices 48 that execute the functionality of application 6. These instructions executed by processors 40 may cause computing device 2 to store information within storage devices 48 during program execution. Processors 40 may execute application 6 to perform various actions.

Storage devices 48 may include application 6. Application 6 may execute on processors 40 to receive a document via communication units 44 and to render the content specified by the received document for display at a display device, such as user interface device 4 included or otherwise operably coupled to computing device 2.

Application 6 may include document renderer 30 and one or more widget renderers 56. Document renderer 30 may process the document received by application 6 to determine the content elements included in the document, including determining if there are one or more static elements included in the document and if there are one or more widgets included in the document. Document renderer 30 may also determine, based on the document, the layout of the content elements included in the document when the content elements are rendered.

Document renderer 30 may determine if the document specifies one or more widgets. For each widget specified by the document, document renderer 30 may determine if one or more widget renderers 56 include an optimized widget renderer for the specific widget type of the widget. If document renderer 30 determines that one or more widget renderers 56 include an optimized widget renderer for the specific widget type of the widget, the determined optimized widget renderer may render the widget.

If document renderer 30 determines that one or more widget renderers 56 in application 6 does not include an optimized widget renderer for the specific widget type of the widget, document renderer 30 may determine if one or more widget renderers 56 includes a default widget renderer for the specific widget type of the widget. A default widget renderer may be for the specific widget type of the widget. If document renderer determines that one or more widget renderers 56 includes a default widget renderer for the specific widget type of the widget, the determined default widget renderer may render the widget.

If document renderer 30 determines that one or more widget renderers 56 does not include a default widget renderer for the specific widget type of the widget, document renderer 30 may retrieve the default widget renderer for the specific widget type of the widget via communication units 44 from a location in a network specified in the document. Responsive to retrieving the default widget renderer for the specific widget type of the widget, the retrieved default widget renderer may render the widget.

Figure 4:
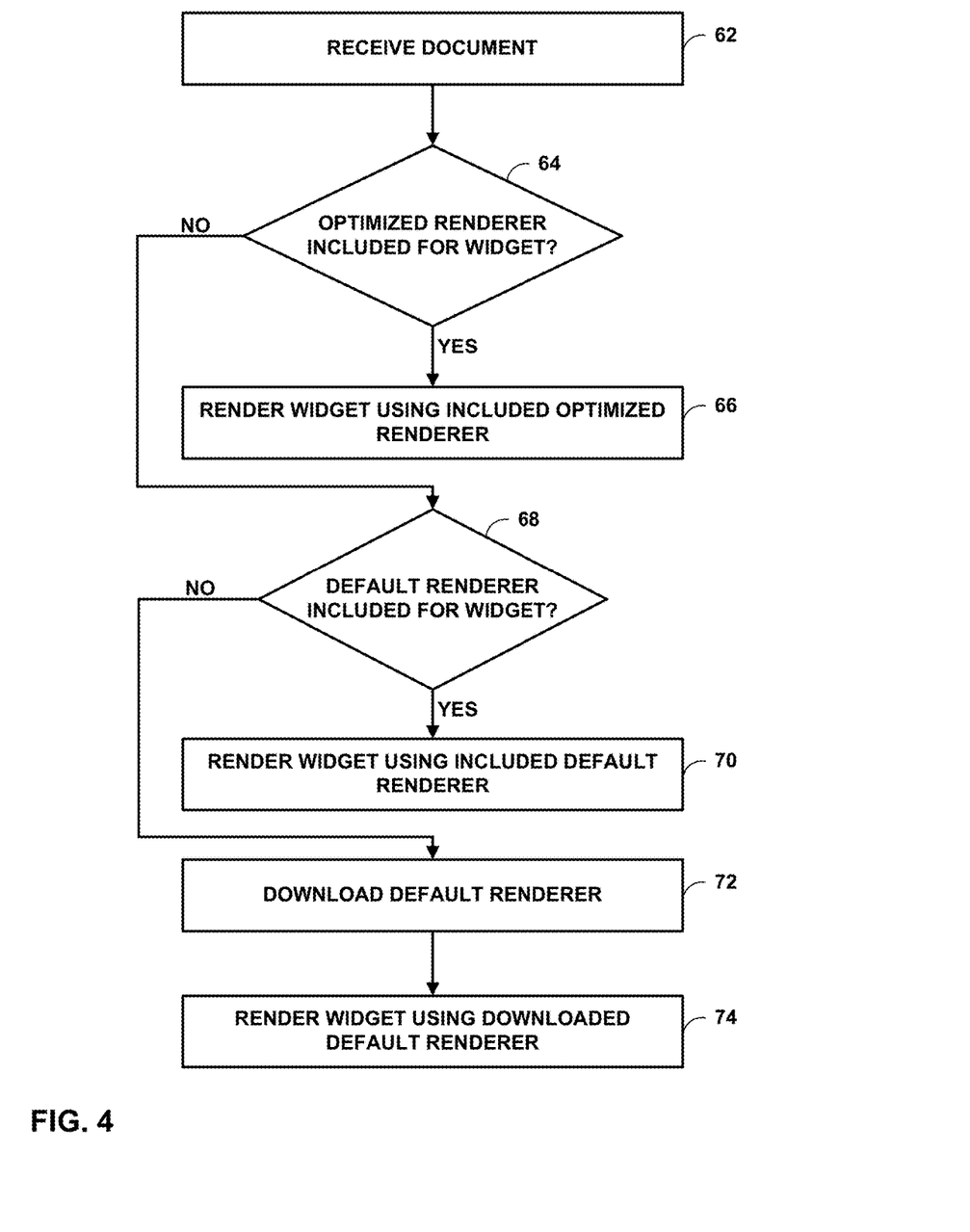
FIG. 4 is a flowchart illustrating an example process for rendering a document according to some aspects of the present disclosure.

FIG. 4 is a flowchart illustrating an example process for rendering a document according to some aspects of the present disclosure. As shown in FIG. 4, application 6 executing on a target platform, such as computing device 2, may receive document 14 from server 12 so that the content specified by the document 14 may be rendered by application 4 in a user interface displayed by user interface device 4 (62). Document 14 may specify one or more widgets, such as widgets 22A-22C, of one or more widget types. Document 14 may also specify one or more static elements, such as one or more static elements 26.

Application 6 may render one or more static elements 26 specified by the document. Application 6 may also render one or more widgets specified by document 14. Application 6 may determine, for a widget in document 14 of a particular widget type, if application 6 includes an optimized widget renderer for the particular widget type (64). An optimized widget renderer may comprise code written using an API that is native to computing device 2. In some examples, the widget as rendered by the optimized widget renderer for the respective widget type includes one or more features not available for the widget as rendered by the default widget renderer for the respective widget type. If application 6 includes the optimized widget renderer for the particular widget type, the optimized widget renderer for the widget type may render the widget (66).

If application 6 does not include the optimized widget renderer for the particular widget type, a default widget renderer for the widget type may render the widget. A default widget renderer may comprise cross-platform code for a plurality of target platforms including computing device 2. For example, application 6 may comprise a web browser and the default widget renderer may comprise code (e.g., JavaScript code) that is processed by the web browser (e.g., application 6). However, because application 6 may not necessarily include the default widget renderer for the particular widget type, application 6 may determine if it includes the default widget renderer for the particular widget type (68). If application 6 includes the default widget renderer for the particular widget type, the default widget renderer for the particular widget type included in application 6 may render the widget (70).

If application 6 does not include the default widget renderer for the particular widget type, application 6 may download the default widget renderer for the particular widget type at a network location specified by document 14 (72). Responsive to application 6 receiving the default widget renderer for the particular widget type, the downloaded default widget renderer for the particular widget type may render the widget (74).

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to aspects of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Various aspects of the disclosure have been described. These and other aspects are within the scope of the following claims.

The invention claimed is:

1. A method comprising:
    rendering, by an application executing on one or more processors of a target platform, one or more widgets of each of a first widget type and a second widget type that are specified by a document, the rendering including:
        in response to determining, by the application, that the application includes a first native widget renderer for rendering the one or more widgets of the first widget type, wherein the first native widget renderer is written using an application program interface (API) that is native to the target platform, rendering the one or more widgets of the first widget type by executing, with the one or more processors, code making up the first native widget renderer for the first widget type, and
        in response to determining, by the application, that the application does not include a second native widget renderer for rendering the one or more widgets of the second widget type, wherein the second native widget renderer is written using the API that is native to the target platform, rendering the one or more widgets of the second widget type by executing with the one or more processors, code making up a default widget renderer for rendering the second widget type, wherein the default widget renderer is written using cross-platform code for a plurality of target platforms including the target platform.

2. The method of claim 1, wherein the one or more widgets of the first widget type rendered by the first native widget renderer for rendering the one or more widgets of the first widget type includes one or more features that are not available for the one or more widgets of the first widget type rendered by a first default widget renderer for rendering the first widget type.

3. The method of claim 1, further comprising:
downloading, by the application, the default widget renderer for rendering the second widget type from a network location specified by the document.

4. The method of claim 3, wherein:
the application comprises a web browser; and
the default widget renderer comprises JavaScript code that is processed by the web browser.

5. The method of claim 1, further comprising:
rendering, by the application executing on the target platform, one or more static elements specified by the document.

6. A system comprising:
at least one processor;
at least one memory device;
at least one module stored by the at least one memory device and executable by the at least one processor, wherein the at least one module is configured to perform operations comprising:
rendering, by an application executing on a target platform, a document that specifies one or more widgets of each of a first widget type and a second widget type, the rendering including:
in response to determining, by the application, that the application includes a first native widget renderer for rendering the one or more widgets of the first widget type, wherein the first native widget renderer is written using an application program interface (API) that is native to the target platform, rendering the one or more widgets of the first widget type by the first native widget renderer for first widget type, and
in response to determining, by the application, that the application does not include a second native widget renderer for rendering the one or more widgets of the second widget type, wherein the second native widget renderer is written using the API that is native to the target platform, rendering the one or more widgets of the second widget type by a default widget renderer for the second widget type, wherein the default widget renderer is written using cross-platform code for a plurality of target platforms including the target platform.

7. The system of claim 6, wherein the one or more widgets of the first widget type rendered by the first native widget renderer for rendering the one or more widgets of the first widget type includes one or more features that are not available for the one or more widgets of the first widget type rendered by a first default widget renderer for rendering the first widget type.

8. The system of claim 6, wherein the at least one module is configured to perform operations comprising:
downloading, by the application, the default widget renderer for rendering the second widget type from a network location specified by the document.

9. The system of claim 8, wherein:
the application comprises a web browser; and
the default widget renderer comprises JavaScript code that is processed by the web browser.

10. The system of claim 6, wherein the operations further comprise:
rendering, by the application executing on the target platform, one or more static elements specified by the document.

11. A computer program product comprising a non-transitory computer readable storage medium having program code embodied therewith, the program code executable by at least one processor to:
render, by an application executing on a target platform, a document that specifies one or more widgets of each of a first widget type and a second widget type, the rendering including:
in response to determining, by the application, that the application includes a first native widget renderer for rendering the one or more widgets of the first widget type, wherein the first native widget renderer is written using an application program interface (API) that is native to the target platform, render the one or more widgets of the first widget type by the first native widget renderer for the first widget type, and
in response to determining, by the application, that the application does not include a second native widget renderer for rendering the one or more widgets of the second widget type, wherein the second native widget renderer is written using the API that is native to the target platform, render the one or more widgets of the second widget type, by a default widget renderer for rendering the second widget type, wherein the default widget renderer is written using cross-platform code for a plurality of target platforms including the target platform.

12. The computer program product of claim 11, wherein the one or more widgets of the first widget type rendered by the first native widget renderer for rendering the one or more widgets of the first widget type includes one or more features that are not available for the one or more widgets of the first widget type rendered by a first default widget renderer for rendering the first widget type.

13. The computer program product of claim 11, wherein the program code is further executable by at least one processor to:
download, by the application, the default widget renderer for rendering the second widget type from a network location specified by the document.

14. The computer program product of claim 13, wherein:
the application comprises a web browser; and
the default widget renderer comprises JavaScript code that is processed by the web browser.

15. The computer program product of claim 11, further comprising:
render, by the application executing on the target platform, one or more static elements specified by the document.

* * * * *

UNITED STATES PATENT AND TRADEMARK OFFICE
CERTIFICATE OF CORRECTION

PATENT NO. : 10,135,910 B2  
APPLICATION NO. : 14/038600  
DATED : November 20, 2018  
INVENTOR(S) : Michael Du Plessis et al.

Page 1 of 1

It is certified that error appears in the above-identified patent and that said Letters Patent is hereby corrected as shown below:

On the Title Page

Item (12) Replace "Duplessis et al." with --Du Plessis et al.--

Item (72) Inventors: Replace "Michael A. Duplessis" with --Michael Du Plessis--

Signed and Sealed this  
Twenty-second Day of October, 2019

Andrei Iancu  
*Director of the United States Patent and Trademark Office*